(12) United States Patent
van Hooft et al.

(10) Patent No.: US 10,182,649 B2
(45) Date of Patent: Jan. 22, 2019

(54) STAND FOR A PORTABLE DEVICE WITH A GRAPHIC USER INTERFACE DISPLAY

(71) Applicant: BakkerElkhuizen Innovations B.V., Almere (NL)

(72) Inventors: Jan Thomas Lambertus van Hooft, Almere (NL); Tristan Margareth Raphael Petronella Frencken, 's-Hertogenbosch (NL)

(73) Assignee: OAHWIP B.V., Vught (NL)

( * ) Notice: Subject to any disclaimer, the term of this patent is extended or adjusted under 35 U.S.C. 154(b) by 0 days.

(21) Appl. No.: 14/765,727

(22) PCT Filed: Feb. 4, 2013

(86) PCT No.: PCT/NL2013/050054
§ 371 (c)(1),
(2) Date: Aug. 4, 2015

(87) PCT Pub. No.: WO2014/119992
PCT Pub. Date: Aug. 7, 2014

(65) Prior Publication Data
US 2015/0374118 A1    Dec. 31, 2015

(51) Int. Cl.
*A47B 23/04* (2006.01)
*A45C 11/00* (2006.01)
(Continued)

(52) U.S. Cl.
CPC ............ *A47B 23/043* (2013.01); *A45C 11/00* (2013.01); *F16B 1/00* (2013.01); *F16B 11/006* (2013.01);
(Continued)

(58) Field of Classification Search
CPC . A45C 2011/003; G06F 1/1628; F16M 11/04; A47B 23/043; H05K 5/0234
(Continued)

(56) References Cited

U.S. PATENT DOCUMENTS 2,611,572 A * 9/1952 La Rocca .................. G09F 1/06
248/174
3,447,770 A * 6/1969 Gallamos ............. A47B 23/043
248/453
(Continued)

FOREIGN PATENT DOCUMENTS

CN          202049413        11/2011
DE    20 2010 002781        8/2010
(Continued)

OTHER PUBLICATIONS

International Search Report from PCT/NL2014/050124 dated Nov. 7, 2014.
(Continued)

*Primary Examiner* — Eret C McNichols
(74) *Attorney, Agent, or Firm* — Adsero IP

(57) ABSTRACT

A stand for supporting a portable device has a first panel for supporting the device, a second panel hinged so as to be pivotable relative to the first panel about a first hinge axis and an angle setting leg hinged so as to be pivotable relative to the first panel or the second panel about a second hinge axis and having a free end releasably connectable to the other one of the first panel and the second panel at a distance from the first hinge axis for setting an angle between the first panel and the second panel. A flexible attachment flap projects from and extends along at least a portion of at least one edge of the first panel. The flap has an attachment surface for attachment to a bottom surface of or attached to the device.

8 Claims, 9 Drawing Sheets

(51) Int. Cl.

| | | |
|---|---|---|
| F16M 11/10 | (2006.01) | |
| F16M 11/38 | (2006.01) | |
| F16M 13/00 | (2006.01) | |
| F16M 13/02 | (2006.01) | |
| F16B 1/00 | (2006.01) | |
| F16B 11/00 | (2006.01) | |
| G06F 1/16 | (2006.01) | |

(52) U.S. Cl.
CPC ............ *F16M 11/10* (2013.01); *F16M 11/38* (2013.01); *F16M 13/00* (2013.01); *F16M 13/022* (2013.01); *G06F 1/1633* (2013.01); *A45C 2011/003* (2013.01); *A45C 2200/15* (2013.01); *F16B 2001/0028* (2013.01); *F16B 2001/0035* (2013.01)

(58) Field of Classification Search
USPC .......................................... 248/447, 454–456
See application file for complete search history.

(56) References Cited

U.S. PATENT DOCUMENTS

| | | | |
|---|---|---|---|
| 4,197,618 A | 4/1980 | Bourguignon | |
| 4,622,767 A * | 11/1986 | Sullivan | A47G 1/143 248/463 |
| 4,674,724 A * | 6/1987 | Gaudet | A47B 23/044 248/459 |
| 5,083,663 A * | 1/1992 | Conway | B65D 5/5206 206/45.26 |
| 5,234,190 A * | 8/1993 | Cross | A47B 97/08 248/459 |
| 5,253,840 A * | 10/1993 | Sheremetta | A47B 23/043 248/205.3 |
| 5,413,305 A | 5/1995 | Leeb | |
| 5,451,025 A * | 9/1995 | Hames | A47B 23/043 248/452 |
| 6,082,696 A * | 7/2000 | Patterson | F16M 11/10 248/447 |
| 6,098,952 A | 8/2000 | Tonn | |
| 6,515,852 B2 | 2/2003 | Huang | |
| 6,538,642 B2 | 3/2003 | Tsai | |
| 6,557,897 B1 * | 5/2003 | Gaudet | A47B 23/044 248/455 |
| 6,585,217 B2 | 7/2003 | Huang | |
| 6,672,549 B2 * | 1/2004 | Kolb | B60R 11/0241 248/127 |
| 6,898,075 B2 | 5/2005 | Li | |
| 6,967,836 B2 * | 11/2005 | Huang | A45C 3/02 361/679.46 |
| 7,248,904 B2 | 7/2007 | Gartrell | |
| 7,281,698 B2 | 10/2007 | Patterson, Jr. | |
| 7,694,920 B2 | 4/2010 | Lien | |
| 7,735,644 B2 * | 6/2010 | Sirichai | A45F 5/02 206/320 |
| 7,758,009 B1 | 7/2010 | Chang | |
| 7,861,995 B2 * | 1/2011 | Liou | F16M 11/105 248/454 |
| D651,213 S * | 12/2011 | Magness | D14/447 |
| 8,100,376 B2 * | 1/2012 | Ye | A47B 23/043 248/454 |
| 8,230,992 B2 | 7/2012 | Law | |
| 8,282,065 B1 | 10/2012 | Stone | |
| 8,382,059 B2 * | 2/2013 | Le Gette | F16M 11/04 248/163.1 |
| 8,714,351 B2 | 5/2014 | Toulotte | |
| 8,749,960 B2 | 6/2014 | Mori | |
| 8,797,132 B2 * | 8/2014 | Childs | A45C 11/00 206/320 |
| 8,833,554 B2 * | 9/2014 | Busri | A45C 11/00 206/320 |
| 8,910,915 B2 * | 12/2014 | Wibby | A47B 23/043 206/45.2 |
| 8,925,722 B2 * | 1/2015 | Poon | F16M 13/00 206/320 |
| 8,960,421 B1 | 2/2015 | Diebel | |
| 9,013,863 B2 | 4/2015 | Hsu | |
| D741,070 S * | 10/2015 | Martin | D14/375 |
| 9,203,945 B2 * | 12/2015 | Chin | G06F 1/1628 |
| 9,267,638 B2 * | 2/2016 | Le Gette | F16M 11/04 |
| 9,287,917 B1 * | 3/2016 | Tages | H04B 1/3888 |
| 9,307,656 B2 * | 4/2016 | Murchison | H05K 5/0013 |
| 9,308,767 B1 * | 4/2016 | Waldron | B42D 15/042 |
| 9,377,810 B2 * | 6/2016 | Hishinuma | G06F 1/1613 |
| 9,382,033 B2 * | 7/2016 | Poon | F16M 13/00 |
| 9,489,015 B2 * | 11/2016 | Gioscia | G06F 1/1628 |
| 9,762,713 B2 * | 9/2017 | Lambert | H04B 1/3877 |
| 9,800,283 B2 | 10/2017 | Schmidt | |
| 2003/0089832 A1 | 5/2003 | Gold | |
| 2003/0213886 A1 | 11/2003 | Gilbert | |
| 2004/0001047 A1 | 1/2004 | Wang | |
| 2006/0007645 A1 * | 1/2006 | Chen | G06F 1/1626 361/679.04 |
| 2007/0283855 A1 | 12/2007 | Pozzi | |
| 2008/0302687 A1 | 12/2008 | Sirichai | |
| 2010/0053876 A1 | 3/2010 | Widmer | |
| 2010/0283269 A1 | 11/2010 | Fiedler | |
| 2011/0069446 A1 | 3/2011 | Trang | |
| 2011/0163211 A1 | 7/2011 | Cicco | |
| 2011/0192857 A1 | 8/2011 | Rothbaum | |
| 2011/0227463 A1 | 9/2011 | Hou | |
| 2012/0018324 A1 | 1/2012 | Hale | |
| 2012/0037047 A1 | 2/2012 | Moldovan | |
| 2012/0072167 A1 | 3/2012 | Cretella, Jr. | |
| 2012/0075789 A1 | 3/2012 | Decamp | |
| 2012/0103855 A1 | 5/2012 | Gaddis, II | |
| 2012/0217174 A1 * | 8/2012 | Ting | G06F 1/1628 206/45.2 |
| 2012/0305739 A1 | 12/2012 | Huang | |
| 2012/0318950 A1 | 12/2012 | Wilber | |
| 2012/0325689 A1 | 12/2012 | Wibby | |
| 2013/0009878 A1 | 1/2013 | Wu | |
| 2013/0015310 A1 | 1/2013 | Wu | |
| 2013/0016467 A1 | 1/2013 | Ku | |
| 2013/0114198 A1 * | 5/2013 | Gengler | B65D 25/00 361/679.08 |
| 2013/0214661 A1 * | 8/2013 | McBroom | G06F 1/1667 312/325 |
| 2014/0183314 A1 | 7/2014 | Mulhern | |
| 2015/0173221 A1 * | 6/2015 | Yoo | H05K 5/0234 248/455 |
| 2015/0194998 A1 | 7/2015 | Fathollahi | |
| 2015/0359120 A1 * | 12/2015 | Huang | A45C 11/00 206/45.23 |
| 2015/0359328 A1 | 12/2015 | van Hooft | |
| 2017/0009934 A1 | 1/2017 | van Hooft | |

FOREIGN PATENT DOCUMENTS

| | | | | |
|---|---|---|---|---|
| DE | 202011000630 U1 * | 10/2011 | ............ | A45C 11/00 |
| DE | 20 2011 101534 | 11/2011 | | |
| EP | 1301847 | 3/2004 | | |
| EP | 1031847 | 6/2006 | | |
| EP | 1577737 | 12/2006 | | |
| EP | 2189873 | 5/2010 | | |
| EP | 1536717 | 8/2011 | | |
| EP | 1447024 | 12/2011 | | |
| EP | 2487877 | 8/2012 | | |
| GB | 2512839 A * | 10/2014 | ............ | A45C 11/00 |
| NL | 1038362 | 11/2010 | | |
| WO | WO 2003/056956 | 7/2003 | | |
| WO | WO-2004034839 A1 * | 4/2004 | .......... | A47B 23/043 |
| WO | WO 2009/131841 | 10/2009 | | |
| WO | WO 2010/036090 A3 | 4/2010 | | |
| WO | WO 2012/016158 | 2/2012 | | |
| WO | WO-2012111994 A2 * | 8/2012 | .......... | G06F 1/1626 |
| WO | WO 2012/125912 | 9/2012 | | |
| WO | WO 2012/166820 | 12/2012 | | |

(56) References Cited

FOREIGN PATENT DOCUMENTS

| WO | WO 2013/158057 | 10/2013 |
|---|---|---|
| WO | WO 2013/162963 | 10/2013 |

OTHER PUBLICATIONS

International Search Report and Written Opinion from PCT/NL2013/050054 dated Nov. 5, 2013.
International Search Report and Written Opinion from PCT/NL2013/050055 dated Jul. 31, 2013.
Examination Report from EP App No. 13 705 844.2 dated Jan. 23, 2017.
Office Action from U.S. Appl. No. 14/765,632 dated Feb. 9, 2017.
Office Action from U.S. Appl. No. 15/121,315 dated Feb. 9, 2017.
Notice of Allowance from U.S. Appl. No. 14/765,632 dated Nov. 16, 2017.
Office Action from U.S. Appl. No. 15/121,315 dated Dec. 12, 2017.
Notice of Allowance from U.S. Appl. No. 15/121,315 dated Apr. 16, 2018.

\* cited by examiner

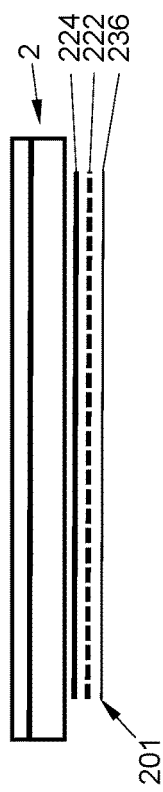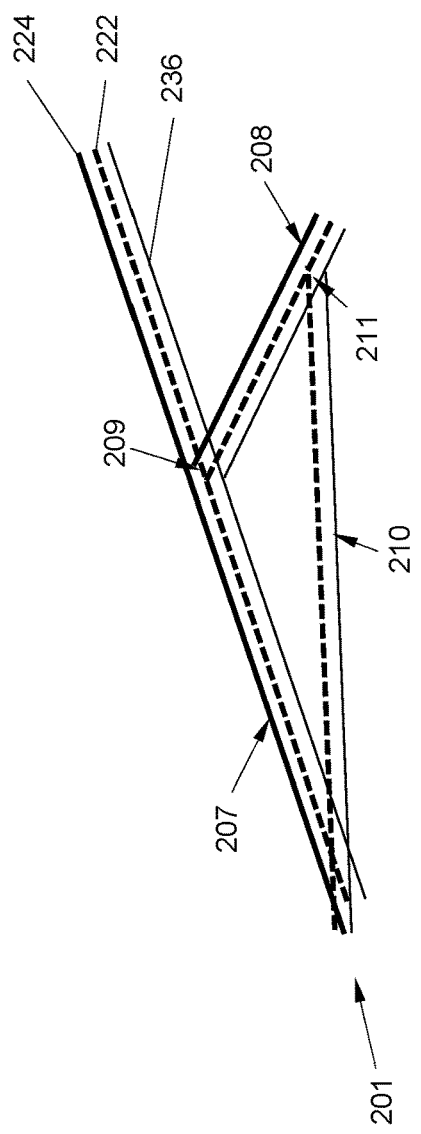

STAND FOR A PORTABLE DEVICE WITH A GRAPHIC USER INTERFACE DISPLAY

RELATED APPLICATIONS

This application is a 35 U.S.C. § 371 national phase application of PCT/NL2013/050054 (WO 2014/119992), filed on Feb. 4, 2013, entitled "Stand for a Portable Device With a Graphic User Interface Display", which is incorporated herein by reference in its entirety.

FIELD AND BACKGROUND OF THE INVENTION

The present invention relates to a stand for a portable device with a graphic user interface, such as a laptop computer or a tablet computer.

Portable computers, usually denoted by the term "laptop computer", "laptop" or "notebook" are not only used during travel, but are also used frequently and for long periods in offices, in particular by users who use the computer regularly in different offices and/or at home. Frequent and prolonged use also occurs in the use of tablet computers that can be operated by touching fields displayed on the display screen, in particular when such devices are (also) operated using a keyboard.

Frequent and prolonged use of such portable computers, of which the design is to a large extent adapted for compactness and portability, entails a number of ergonomic drawbacks. Typically, the position of the display is not sufficiently high, which causes a great risk of neck complaints. For tablet computers an additional problem is supporting the device at a suitable angle so that the display faces in a direction matching the desired viewing angle.

For supporting the display of a laptop computer in an ergonomically better position, a wide variety of laptop supports are known. Examples of laptop supports are shown in applicant's European Patents 1 301 847, 1 447 024 and 1 577 737.

Most laptop supports are intended to be left at a place to work and to be used by user bringing the laptop computer to that place to work. Some laptop and tablet computer stands are foldable to a flat configuration so that also the laptop stand can easily be carried along with the laptop computer and the laptop, such laptop supports are disclosed in European Patents 1 301 847 and 1 447 024. European patent 1 536 717 and U.S. Pat. No. 6,098,952 disclose foldable laptop supports arranged to be attached to a bottom of a keyboard portion of a laptop computer. International patent application WO2010/036090 and U.S. patent application publ. nr. 2012/0072167 disclose supports attachable to a tablet computer.

SUMMARY OF THE INVENTION

It is an object of the present invention to provide a stand for a portable device with a graphic user interface display, such as a laptop computer or a tablet computer, which is better adaptable to a portable device to be supported and less obtrusive.

According to the invention, this object is achieved by providing a stand for supporting a portable device with a graphic user interface display, such as a laptop computer or a tablet computer, with a bottom face at an oblique support angle relative to a top surface carrying the stand, the stand including:

a first panel for supporting the device;

a second panel hinged so as to be pivotable relative to the first panel about a first hinge axis;

an angle setting leg hinged so as to be pivotable relative to the first panel or the second panel about a second hinge axis spaced from the first hinge axis and having a free end releasably connectable to the other one of the first panel and the second panel at positions at a distance from the first hinge axis for setting an angle between the first panel and the second panel; and a flexible attachment flap projecting from and extending along at least a portion of at least one edge of the first panel, the flap having an attachment surface for attachment to a bottom surface of or attached to the device.

The flexible attachment flap projecting from and extending along at least a portion of at least one edge of the first panel and having an attachment surface for attachment to a bottom surface of or attached to the device allows to more evenly and easily adapt the shape of the stand to the shape of the bottom of the device along at least a portion of the contour of the stand, so that a smoother transition from the outer surface of the stand to the outer surface of the device is obtained. A smooth transition from the stand to the device reduces the likelihood that an outer edge of the stand clings to or damages other items, such as books and papers, for instance when the device is inserted into a briefcase or a bag and makes the stand visually less obtrusive, in particular when in collapsed condition folded flat against the bottom of the device. A better accommodation of the shape of the stand where it is attached to the device also provides an easier and more reliable attachment of the stand to the device.

Particular elaborations and embodiments of the invention are set forth in the dependent claims.

Further features, effects and details of the invention appear from the detailed description and the drawings.

BRIEF DESCRIPTION OF THE DRAWINGS

FIG. 10 is a schematic cross-sectional side view of a laptop and a stand in collapsed condition in side view along the line X-X in FIG. 6;

FIG. 11 is a schematic side view of the stand according to FIGS. 11 and 15 in a configuration for use supporting a laptop computer;

DETAILED DESCRIPTION

Figure 1:
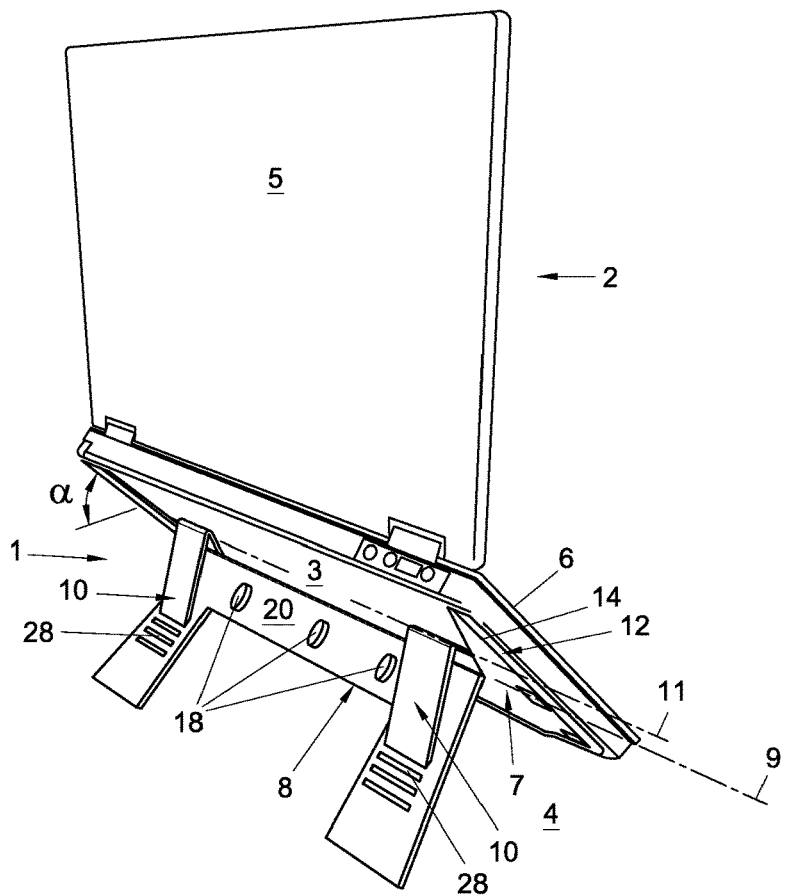
FIG. 1 is a perspective view of an example of a stand according to the invention in a configuration for use supporting a laptop computer.
Figure 2:
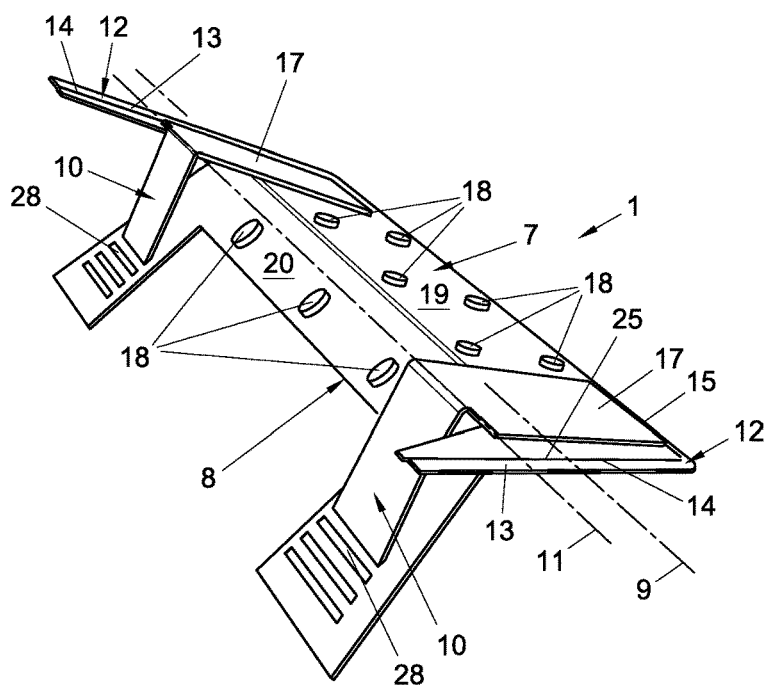
FIG. 2 is a view similar to the view of FIG. 1 without the laptop computer.
Figure 3:
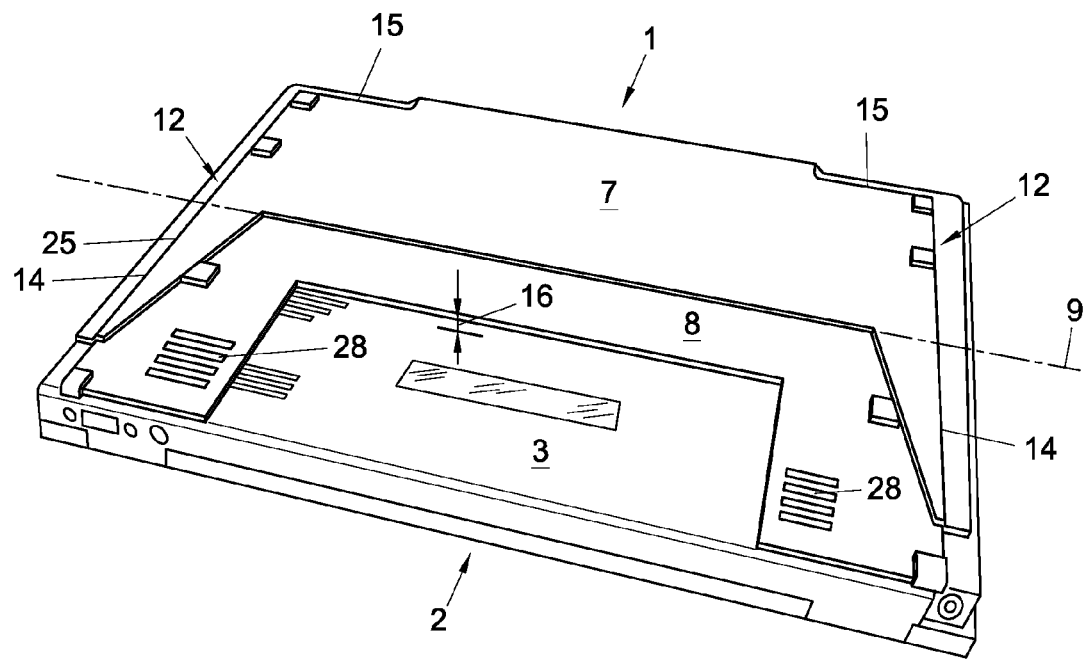
FIG. 3 is a perspective view of the stand shown in FIGS. 1 and 2 in collapsed transport configuration upside down and attached to the bottom of the laptop computer in an upside down orientation.
Figure 4:
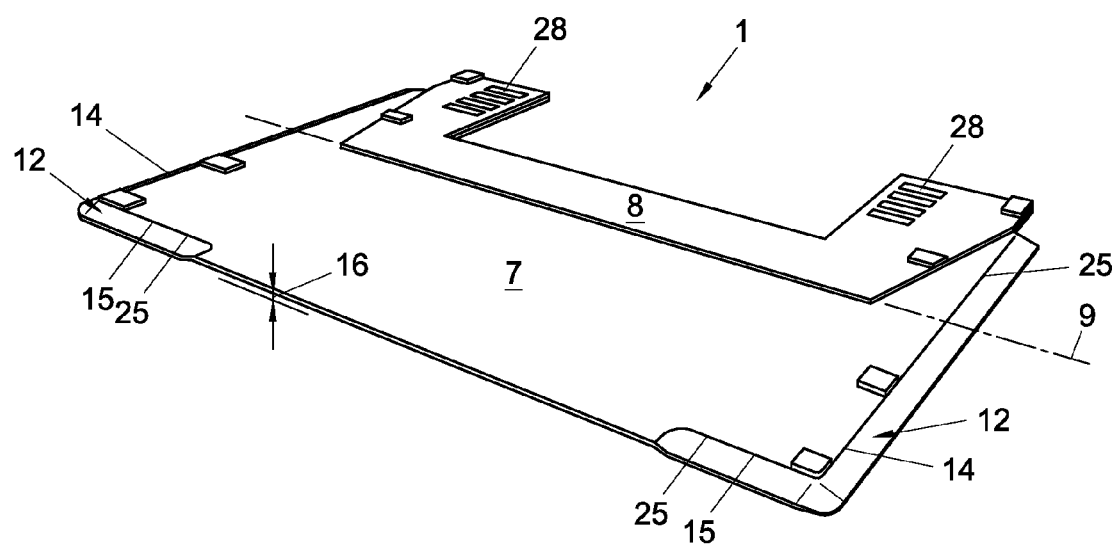
FIG. 4 is a view similar to the view of FIG. 1, but from an approximately opposite side and without the laptop computer.
Figure 5:
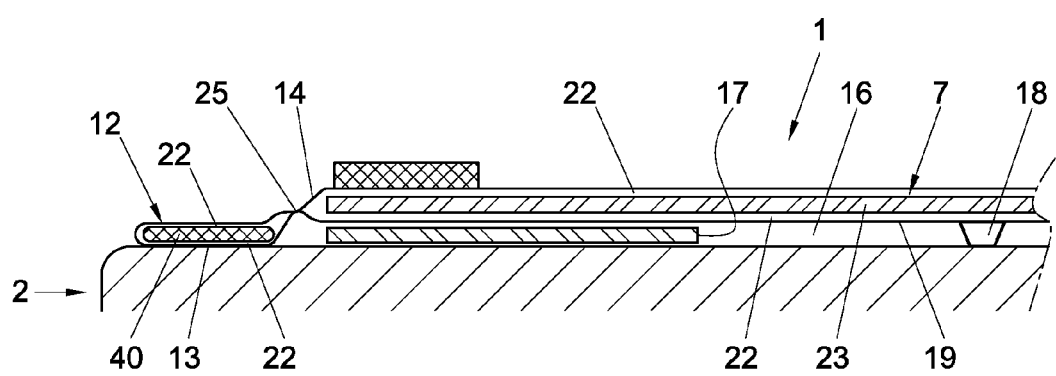
FIG. 5 is a cross-sectional view of a front corner portion of the stand shown in FIGS. 1-4, upside down attached to the bottom of an upside down laptop computer.

A first example of a stand 1 according to the invention is shown in FIGS. 1-5. In FIGS. 1, 3 and 5, the stand 1 is shown in a condition attached to a bottom of a laptop computer 2. The stand 1 can also be attached to a bottom of another portable device with a graphic user interface display, such as a tablet computer. In erected, i.e. unfolded condition, the stand 1 supports the portable device 2, with a bottom face 3 at an oblique support angle relative to a top surface 4, such as a desktop surface, carrying the stand 1. For a laptop computer, the main advantage of using such a stand is that the display portion 5 is lifted so that it can be viewed by a user at an ergonomically better viewing angle. This is achieved because the stand 1 holds the rear end of the keyboard portion 6 of the laptop computer 1, where the display portion is hinged thereto, in a position lifted from the desktop surface, preferably over a distance of at least 5 cm and more preferably over a distance of at least 10 cm. It is also preferred that the distance over which the rear end of the keyboard portion 6 of the laptop computer 1 is lifted from the top surface 4 on which the stand 1 rests is adjustable. To that end, the angle α at which the stand 1 supports the keyboard portion 6 relative to the plane of the top surface 4 is preferably adjustable.

For portable devices with a touch screen, such as tablet computers, the purpose of supporting the device at an angle relative to the top surface 4 resides in orienting the display so that it faces more in the direction of view than when lying flat on the top surface 4 and can be operated more easily.

The stand 1 according to the present example is composed of a first panel 7 for supporting the device 1, a second panel 8 hinged so as to be pivotable relative to the first panel 7 about a first hinge axis 9 and angle setting legs 10. The angle setting legs 10 are hinged so as to be pivotable relative to the first panel 7 about a second hinge axis 11 spaced from the first hinge axis 9 and have free ends releasably connectable to the second panel 8 at a plurality of positions at different distances from the first hinge axis 9 for adjusting a setting angle between the first panel 7 and the second panel 8.

The stand is specifically arranged to be attached to the bottom of the device 2, so that transporting it along with the device 2 does not entail packing and unpacking an additional separate item. Moreover, by attaching the device 2 to the stand 1, reliable positioning of the device 2 on the stand 1, when supported in a position for use, is ensured.

The stand 1 has flexible attachment flaps 12 projecting from and extending along edges 14, 15 of the first panel 7. The flaps 12 have attachment surfaces 13 for attachment to the bottom surface 3 of the device 2. The flexible attachment flaps 12 allows an even and easy adaptation of the shape of the stand 1 along its contour to the shape of the bottom 3 of the device 2, so that a smooth transition from the outer surface of the stand 1 to the outer surface 3 of the device 2 is obtained. A smooth transition from the stand 1 to the device 2 reduces the likelihood that an outer edge of the stand 1 clings to or damages other items, such as books and papers when the device with the stand 1 is inserted into for instance a briefcase or bag and makes the stand 1 visually less obtrusive. A good accommodation of the shape of the stand 1 to the shape of the bottom face 3 of the device 2 where it is attached to the device 2 also facilitates a reliable attachment of the stand 1 to the device 2.

According to the present example, the stand 1 has two flaps 12 that each extend along a first edge 14 and along a portion of a second edge 15. It is however also possible to provide other configurations of one or more flaps. The stand may for instance have only one flexible flap that extends along a portion or the entire length of only one edge or a plurality of flexible flaps of which one or more flexible flaps each extend along only a portion or along an entire length of an edge of the first panel of the stand. A further advantage of one or more of such flexible flaps is, that starting off from a basic stand design, the outer contour of the stand can easily be cut to a shape matching a bottom design of the device to which the stand is to be attached.

It is preferred that, as in the present example, the flexible attachment flaps 12 project from and extend along at least a portion of at least two, preferably opposite edges 14 of the first panel 7, so that the stand 1 can be reliably attached to the device 2 along two, preferably opposite, edges.

For a particularly smooth and unobtrusive transition from the stand 1 to the bottom 3 of the device 2, it is furthermore advantageous if, also as in the present example, the flexible attachment flap or flaps 12 extend along at least portions of three edges 14, 15 of the first panel 7.

A tendency of edges of the stand to cling to other items is reduced particularly effectively because the flexible attachment flaps 12 extend around corners of the first panel 7 where edges 14, 15 of the first panel 7 meet. Such corners may be rounded, for instance with a radius of 5 to 15 mm. That the flexible attachment flaps 12 extend around corners of the first panel 7 also contributes to a smooth and visually unobtrusive transition from the stand 1 to the device 2.

Although the described advantages are achieved to a larger extent, the more the edges of the stand are fringed by the flexible flap or flaps, it can be preferable to leave portions of the edges of the stand without a fringing flexible flap, to allow air to pass through a gap 16 between the stand 1 and the bottom 3 of the device 2 (see FIGS. 3, 4 and 5).

To ensure that the gap 16 remains open, even if the stand 1 is pressed towards the bottom 3 of the device 2 in a central area, for instance due to resting on a soft or uneven surface or on the user's lap, spacers 17, 18 are mounted to surfaces 19, 20 of the first and second panels 7, 8 facing the bottom 3 of the device 2 when the stand 1 is in folded flat condition.

Outer ones 17 of the spacers are contiguous with the angle setting legs 10 that are hinged thereto along the hinge axis 11 and bound the gap 16 on opposite sides leaving free a funnel that projects obliquely upwardly when the stand 1 is in unfolded condition, for instance as shown in FIGS. 1 and 2. In top view, the other spacers 18 are of a lens or, preferably symmetrical, wing profile shape oriented parallel to the orientation of the funnel 16 to keep aerodynamic resistance encountered by air passing through the funnel 16 low.

The attachment surfaces 13 of the flexible attachment flap 12 carry a layer of self-adhesive material. Because of the flexibility of the attachment flaps, it can easily and reliably be ensured that the self-adhesive layer is effectively pressed against the bottom 3 of the device 2, even if the bottom 3 has a locally rounded or stepped shape deviating from a flat plane and/or tolerances of the flatness of the first panel 7 and/or the bottom 3 cause the first panel 7 and the bottom 3 to be slightly skewed relative to each other. The flexibility of the attachment flaps 12 also allows the flaps to be locally pressed against the bottom 3 with a relatively high pressure, which is favourable for an effective adhesion of pressure sensitive self-adhesive material. The flexibility of the attachment flaps 12 is also favourable for easy removal of the stand 1 from the device 2, because the flexibility allows the flaps 12 to be peeled off the bottom 3 of the device 2.

The flexibility of the attachment flaps is also advantageous for reliable attachment and easy peelability away from the bottom 3 of the device if the attachment material of the flexible flaps is of another type allowing release along a progressing front by peeling, such as a hook or loop fastening material or an array of magnetically attractable elements, arranged for co-operation with corresponding attachment members attached to the bottom of the device.

The stand 1 according to the present example can be manufactured in a simple manner, since it has outer layers 22 of flexible sheet material sandwiched with plates 23, 24 defining the first and second panels 7, 8, the flexible sheet material 22 constituting the hinge between the first and second panels 7, 8 and constituting outer layers of the flexible attachment flaps 12. Furthermore, sharp and hard outer edges of the stand are avoided because the flexible outer layers also cover the outer edges of the plates 23, 24 defining the first and second panels 7, 8.

To facilitate handling of the flexible flaps 12 and in particular to avoid inadvertent premature sticking of the flaps to the bottom face 3, or even to the first panel 9 of the stand 1 itself, prior to accurate positioning of the stand 1 relative to the device 2 while attaching the stand 1 to the device 2, the flexible flaps include a stiffening layer 40 (see FIG. 5), which provides a slight degree of stiffness to the flaps 12 that facilitates handling of the flexible flap 12. Such a layer can for instance be a layer of massive or foam rubber or a synthetic material of similar stiffness.

According to the present example, two of the outer layers of flexible sheet material 22 are provided and the plates 23, 24 defining the first and second panels are sandwiched between the two outer layers of flexible sheet material 22, so the plates 23, 24 are fully enclosed by the flexible sheet material. The plates 23, 24 are enclosed in pockets of the flexible sheet material, but it is also conceivable to provide that, as an alternative or addition, the plates and the flexible sheet material are fixed to each other by for instance an adhesive, fasteners or stitching. In the present example, the layers 22 of flexible sheet material are plastic sheet material such as PVC or PE, which are welded to each other along welding seams 25 along the edges 14, 15 of the panel 7, but also other materials such as textile which may be woven or non-woven, coated and or laminated, or leather may be used and layers may be attached to each other along edges of the panels by for instance stitching. The plates can be for instance of metal such as aluminium or steel or a composite material such as a fiberglass/polyester, fiberglass/epoxy or carbon fiber/epoxy composite.

In the present example, the angle setting legs 10 are also formed by panels defined by plates sandwiched with layers of flexible sheet material enclosing the plates. The flexible sheet material extends in a continuous manner from the legs to the spacers 17 and forms a flexible hinge allowing hinging of the legs about the hinge axis 11 in gaps between the plates defining the legs 10 and plates defining the spacers 17. The plates of the legs 10 are preferably steel plate because this allows the angle setting legs to be very flat and, partially because it is thin, steel material springs back to its original shape even after having been bent over a substantial angle.

The angle setting legs 10 have lips insertable in slots 28 in the second panel 8.

Within the framework of the invention as set forth in the claims, many other embodiments than the examples described are conceivable. For instance, according to the present examples, the angle setting legs 10 are hinged to the first panel 7 and connectable to the second panel 8 at different positions for adjusting the angle of the second panel 8 relative to the first panel. It is however also possible to provide that the angle setting leg or angle setting legs is/are hinged to the second panel and connectable to the first panel at different locations.

Also, instead of two angle setting legs, a single angle setting leg or more than two angle setting legs may be provided.

Furthermore, flexible attachment flaps may also be arranged along all four sides of the stand.

Figure 12:
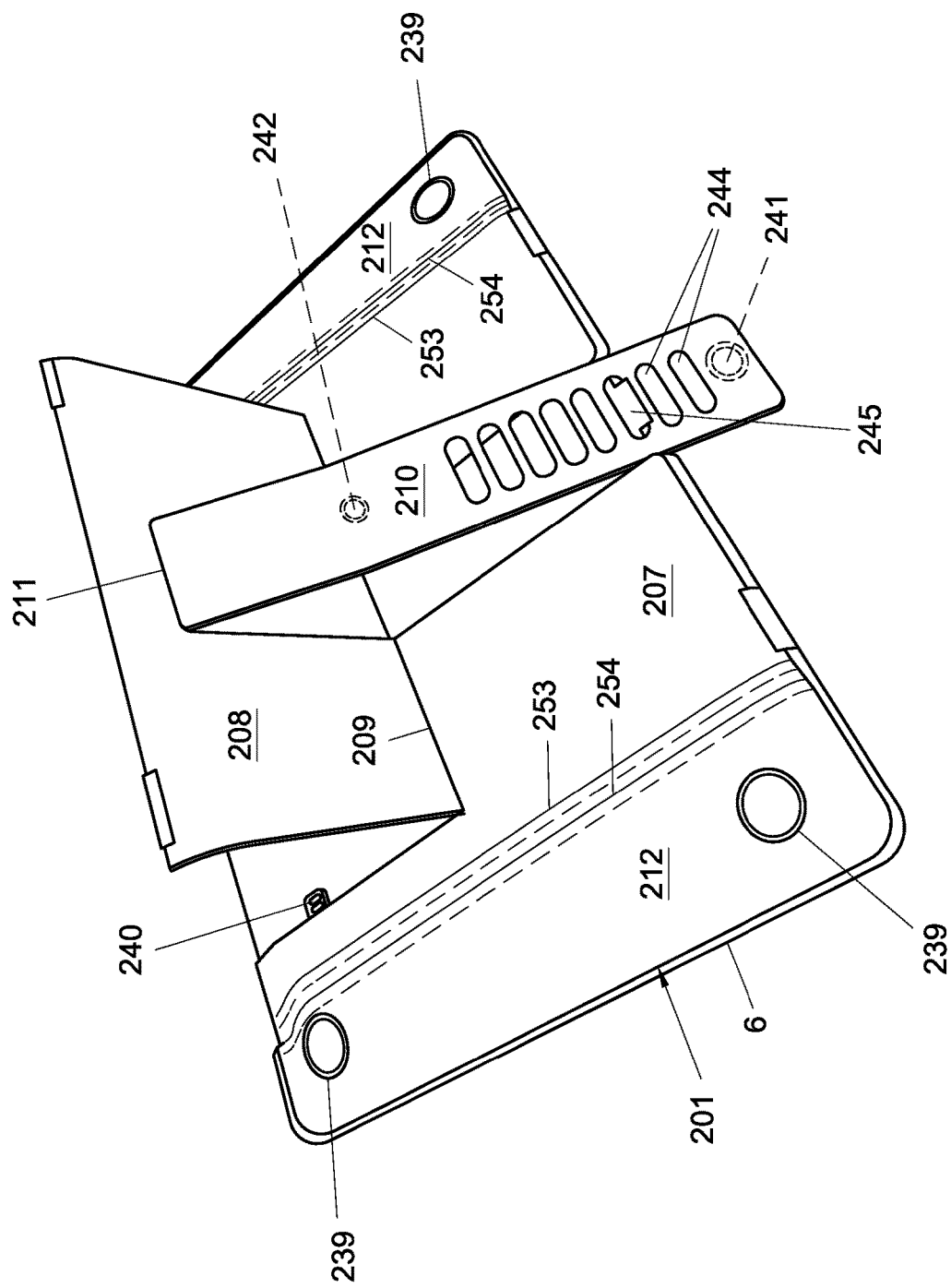
FIG. 12 is a perspective bottom view of a stand according to FIGS. 6-11 in an unfolded condition attached to a bottom of a laptop computer.
Figure 13:
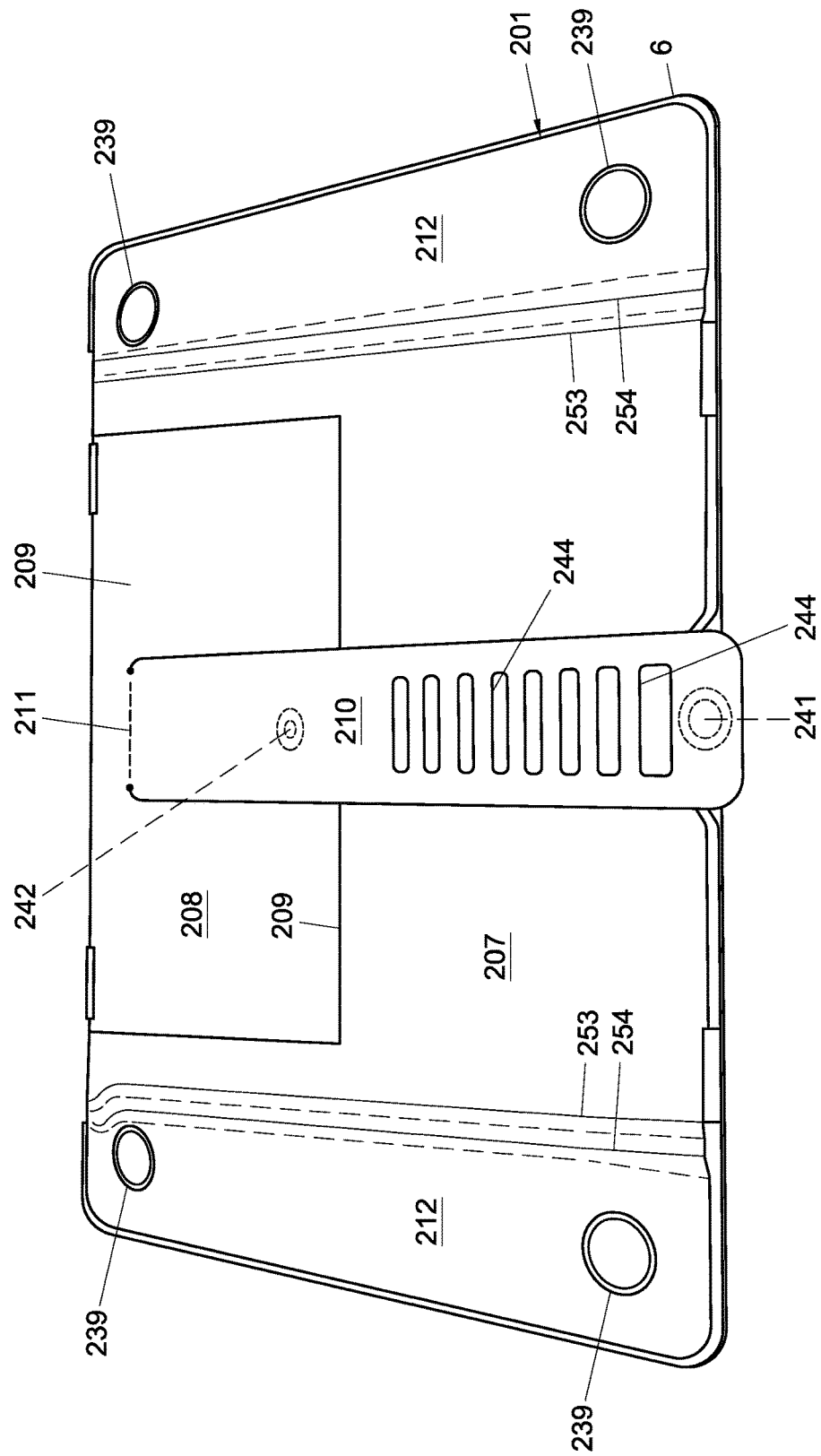
FIG. 13 is a perspective bottom view of the stand and computer as shown in FIG. 12 the stand being in flat-folded condition.
Figure 15:
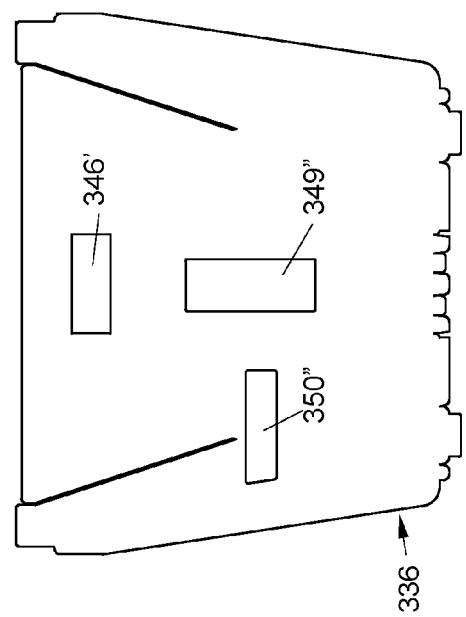
FIG. 15 is a plan view of an outer one of three layers of the stand shown in FIG. 14 at a side to be facing away from the supported device.
Figure 17:
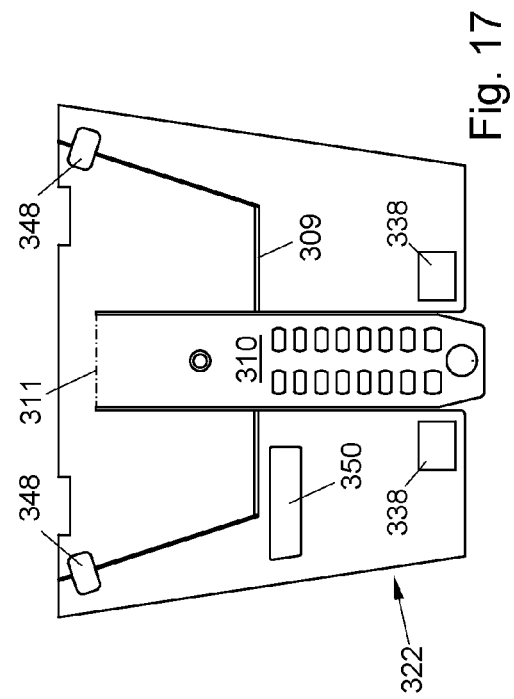
FIG. 17 is a plan view of an outer one of the three layers of the stand shown in FIG. 6 at a side to be facing towards the supported device.
Figure 14:
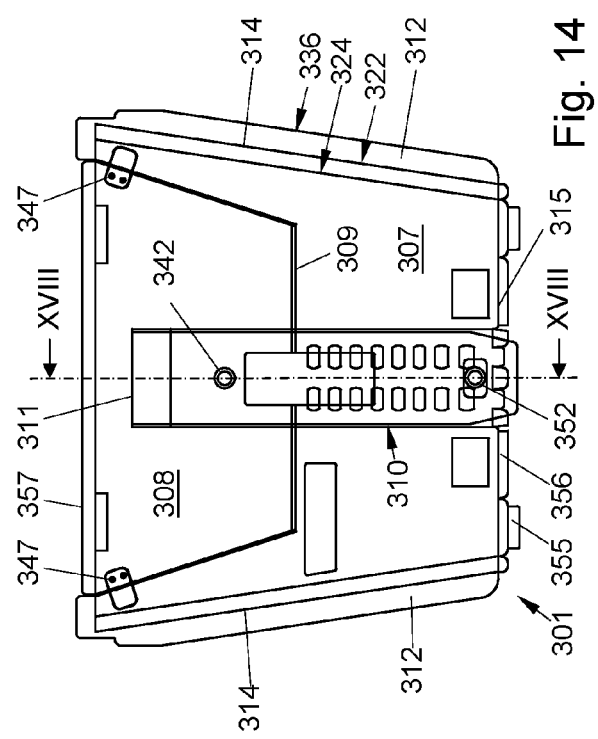
FIG. 14 is a top plan view of a fourth example of a stand according to the invention in which (also concealed) contours of three layers and retaining members of the stand are superimposed.
Figure 16:
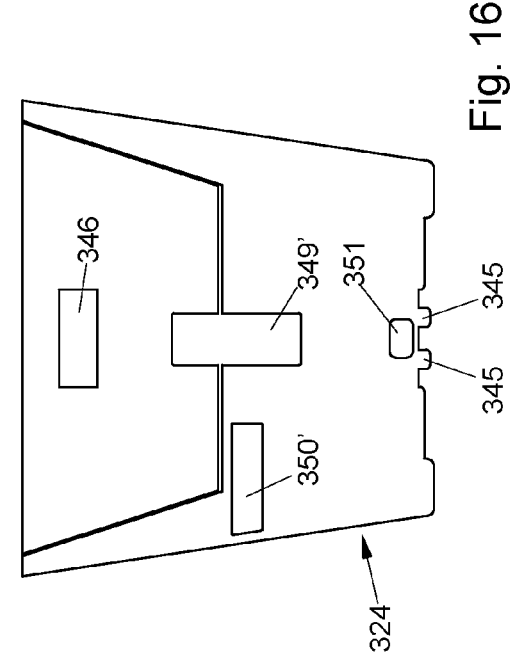
FIG. 16 is a plan view of a middle layer of three layers of the stand shown in FIG. 14; p
Figure 18:
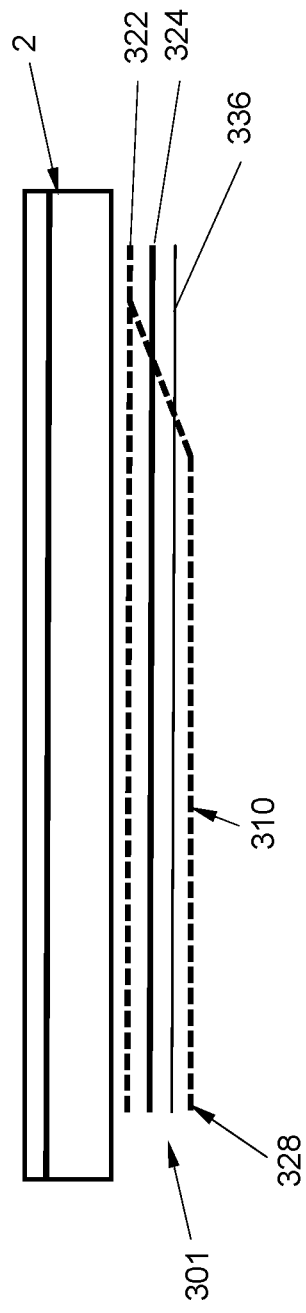
FIG. 18 is a schematic cross-sectional side view of a laptop and a stand in collapsed condition in side view along the line XVIII-XVIII in FIG. 14.
Figure 19:
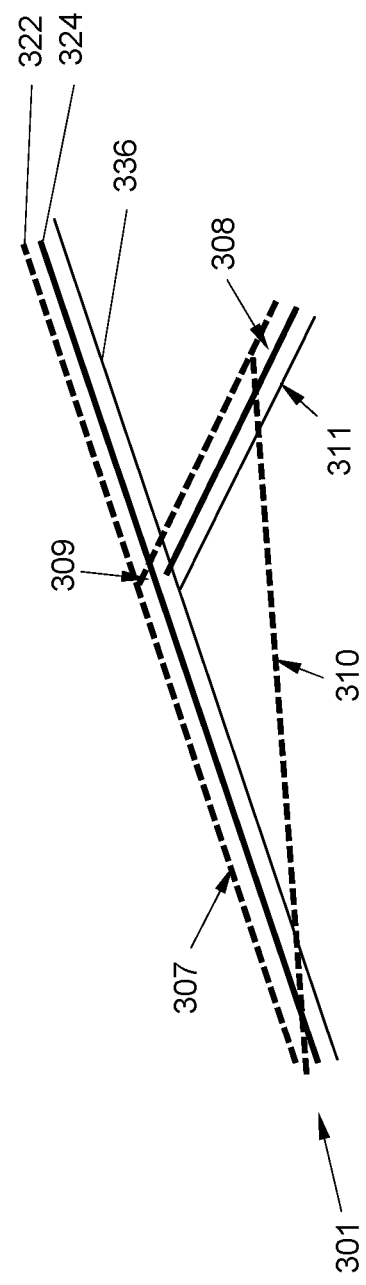
FIG. 19 is a schematic side view of the stand according to FIGS. 14 and 18 in a configuration for use supporting a laptop computer.

In FIGS. 6-13, a second example 201 of a stand according to the invention is shown. The stand has three layers 222, 224 and 236 of which a first one of the outer layers 224 is on a side facing the supported computer 2 when in attached condition and has a flexural stiffness higher than the flexural stiffness of the other two layers 222 and 236. The first, stiff layer 224 is composed of mutually separate panel members 207', 208', which define the first and second panels 207, 208 of the stand 201. The panel members 207', 208' of the first outer layer 224 are preferably made of steel which allows to achieve a high stiffness at a small thickness and which is a magnetic material, so it can co-operate with magnets embedded in the central layer 222. The panel members 207', 208', and accordingly the first panel and second panels 207, 208 may be of a non-flat shape and for instance shaped to closely follow the shape of the bottom of a computer model for which the stand 201 is dedicated when in mounted condition, as is illustrated by FIGS. 12 and 13. This allows increasing stiffness without adding to the thickness of the device-stand combination, reduces the extent to which edges of the stand project from the computer and causes the stand to be particularly unobtrusive visually. The first one of the outer layers 224 is laminated to the central layer 222. The central layer 222 is preferably made of a polymeric material which is flexible enough to form the hinge between the panels 207, 208 and a hinge between the first panel 207 and an angle setting leg 210. The central layer 222 has incisions 237 shaped and positioned to match the shape and positions of the spacing between the panel members 207' and 208' along the portions of that spacing adjoining a hinge 209 formed by a, preferably creased, strip-shaped portion of the layer 222 between ends of incisions 237.

Except for an angle setting leg portion 210', the central layer 222 is laminated against the first outer layer 224, preferably by an adhesive. The central layer is preferably of a polymeric material, such as polyethylene or polypropylene that has a suitable stiffness for the angle setting leg 210 to be operable easily and a good resistance against repeated bending.

A second outer layer 236 is laminated against central layer 222 and against outer portions of the first outer layer 224 that project beyond the central layer 222. The second outer layer 236 is of a thin film material and is more flexible and more easily deformable than the central layer 222. Flaps 212 of the very flexible second outer layer 236 project beyond edges of the central layer and beyond edges 214 of the first outer layer 224 which form contours of portions of the first outer layer 224 projecting from the central layer 236. The flaps are provided with a layer of pressure sensitive adhesive material for attaching the stand 201 to a bottom of a device to be supported. Thus, the second outer layer 236 forms a cover that forms a smooth transition covering the edges of the central layer 222 and the first outer layer 224 when the stand 201 is attached to the device to be supported. Also, the flaps 212 smoothly accommodate to the shape of the bottom of the device and, due to their thickness smaller than the thickness of the other layers 222, 224, also the edges of the second outer layer 236 form a hardly noticeable step relative to the bottom of the device to be supported.

Flaps 255, 256, 257, 258 of the flexible second outer layer 236 are shown in extended orientations, but are to be folded around the edge portions of the first outer layer 222 and the central layer 224 along which these flaps extend. Thus, these edges are upholstered.

The first outer layer 224 is equipped with adhesive pads 238 for providing an additional connection of the first outer layer 224 to the bottom of the device to be supported. Due to flexibility of the portions of the stand projecting obliquely upwardly from the hinge 209 the weight of a display of a supported laptop computer may otherwise cause the computer to tilt backward about the upper end of the second panel 208. Such pads 238 may have a thickness of for instance 2-4 mm to act as spacers for providing a spacing between the stand 201 and a device to which the stand is attached for ventilation purposes.

In the second outer layer 236, openings 239 are provided for support feet of the computer to be supported.

The second outer layer 236 further forms a support for magnets 240, 241, 242 arranged in openings in the central layer 222. The magnets 240, 241, 242 are preferably of the same thickness (e.g. 0.6-1 mm) as the thickness of the second layer 222. The magnets 240, 241, 242 are fixed to the self-adhesive face of the second outer layer 236 and serve for retaining the second panel 208 and, respectively, the angle setting leg 210 against the first outer layer 224, i.e. in a flat configuration in-line with the first panel 207, when the stand 201 is in its flat transport configuration. The magnets 240 in openings in the second panel 208 are mounted to co-operate with opposite projections 243 of first outer layer of the first panel 207 into the first outer layer of the second panel 208. Instead of magnets, also other re-attachable fixations can be used such as a fixation with hook and loop tape.

The angle setting leg forming portion 210' of the central layer 222 and the angle setting leg forming portion 210'' of the second outer layer 236 are provided with mutually corresponding openings 244', 244'' to be hooked to a lip 244 of the first outer panel 224.

Figure 6:
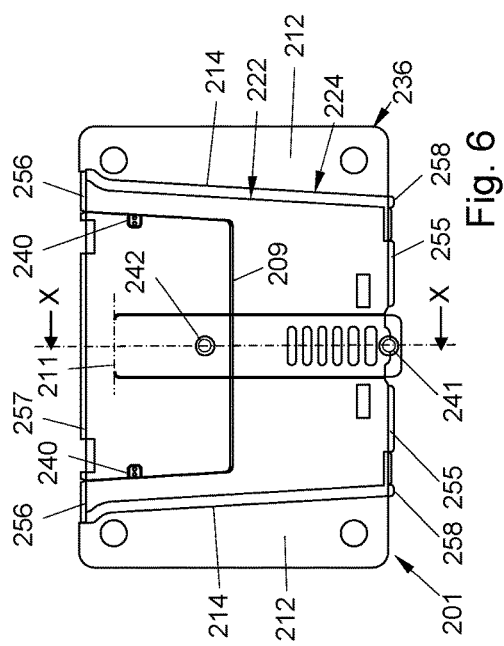
FIG. 6 is a top plan view of a third example of a stand according to the invention in which (also concealed) contours of three layers of the stand and of retaining members are superimposed.
Figure 8:
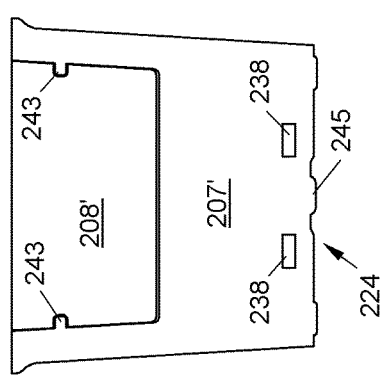
FIG. 8 is a plan view of a middle layer of three layers of the stand shown in FIG. 6.

As is best seen in FIGS. 6 and 13, in the present example, the flexible central layer 222 is slightly less wide than the stiff outer layer 224, so that the all-over thickness of the stand decreases in two steps 253, 254, smoothed by the flexible outer layer 236, from a middle portion toward the flexible attachment flaps 212 (see FIGS. 12 and 13). It is however also possible to provide that the flexible central layer 222 is wider than the stiff outer layer 224, so that it covers outer side edges of the stiff outer layer 224. Thus, the steps 254 where the side edges of the stiff outer layer 224 are located would be even more smoothed out and accordingly less visible. The flexible central layer 222 may extend to the contour of the flexible outer layer 236 as is illustrated by alternative flexible central layer 222' contour represented by dash-and-dot lines in FIG. 9, or form the outer edges of the stand as a whole if it extends beyond the contour of the flexible outer layer 236 or if a flexible outer layer as the layer 236 is not provided at all so that the stand has only one single flexible layer in addition to the stiff layer. Then, only one thickness step, for instance as step 254, but more smoothed as explained above, would be obtained. In such embodiments, the flexible attachment flaps would also or completely be formed by the same flexible layer next to the stiff layer defining the panels, which flexible layer also forms the hinge between the first and second panels and the hinge of the angle setting leg. Accordingly, the attachment surface, for instance a layer of self adhesive material, would be formed on the face of the portions of that flexible layer that are part of the flexible attachment flaps.

If the flexible layer directly next to the stiff layer, which flexible layer also forms the hinge between the first and second panels and the hinge of the angle setting leg forms part of the flexible attachment flaps and covers the stiff layer on its side that is to be facing away from the device to be supported, a particularly strong connection between the stand and the device to be supported is achieved, since the flexible layer that also forms the hinges is, in view of that load bearing function, relatively strong, yet flexible enough to ensure full adhesive contact with the bottom of the device to be supported over a large surface area.

For accommodating to a non-flat shape of the bottom of the device to be supported, the flexible flaps may also be shaped accordingly and have monoaxially and/or biaxially curved portions, for instance to accommodate to a bottom portion of a computer as shown in FIGS. 12 and 13.

Figure 7:
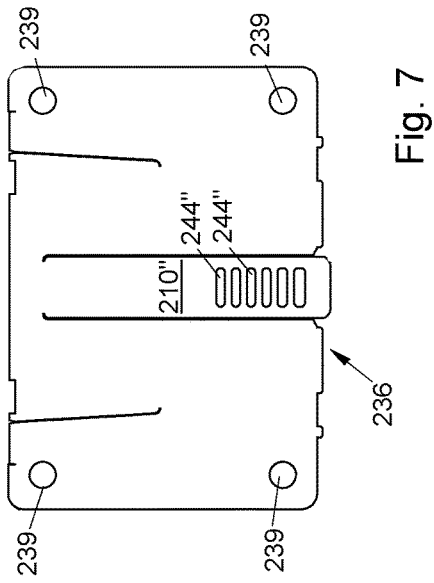
FIG. 7 is a plan view of an outer one of three layers of the stand shown in FIG. 6 at a side to be facing away from the supported device.
Figure 9:
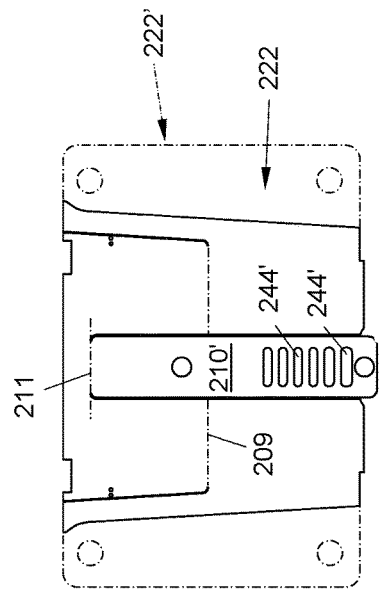
FIG. 9 is a plan view of an outer one of the three layers of the stand shown in FIG. 6 at a side to be facing towards the supported device.

For transporting and storing a stand according to the present invention, for instance in the course of distribution of manufactured stand or if a stand is temporarily detached from a device, it is advantageous if the flexible attachment flaps are protected against damage, for instance in the form of wrinkling and/or sticking of the attachment surface to surfaces from which it cannot be released (easily) without damage. To this end, the attachment surfaces of two or more flexible attachment flaps may be attached to a common backing substrate plate with a stiffness for retaining said flaps in orientations that are substantially parallel to each other. The backing substrate plate may for instance be of the same shape as the largest layer, in this example the second outer layer 236 as shown in FIG. 7 (which can accordingly be considered as a representation of such a substrate plate as well), so that it can be cut to shape together with the second outer layer, or be of a larger shape which provides enhanced protection and facilitates re-attaching a used stand to the substrate for temporary storage. The substrate plate may be further reinforced to also protect the stand as a whole from deformation during transport and storage.

In FIGS. 14-19 a third example of a stand 301 according to the invention is shown. Also this stand has three layers 322, 324, 336 that are laminated to each other. In this example, the layer having the highest flexural stiffness is the central layer 324. The first outer layer 322 at the side of the stand facing the device to be supported when in use is more flexible than the central layer 324 and preferably made of a polymer material such as polyethylene or polypropylene. When mounted to the bottom of a device to be supported, the first outer layer 322 and the central layer 324 are covered by a second outer layer 336 that is thinner and more flexible and more easily deformable than the first outer layer 322. As in the third example, the second outer layer forms flaps 312 that project beyond outermost edges 314 of the covered layers 322 and are adhesively attached. The flaps securely attach the stand 301 to a bottom of the device to be supported and provide a smooth transition with no substantial abrupt steps over these edges and to the bottom of the device is obtained and a smooth accommodation to the shape of the bottom of the device is achieved. The flaps 312 extend along the opposite side edges 314 of the first outer layer 322 and along portions of the first outer layer 322 and the central layer 324 to the side of a distal end of the second panel 308.

Flaps 355, 356, 357 of the flexible second outer layer are shown in extended orientations, but are to be folded around the edge portions of the first outer layer 322 and the central layer 324 along which these flaps extend. Thus, these edges are upholstered.

In the central layer 324 and the second outer layer 336, openings 346, 346' are formed at corresponding positions through which openings an angle setting leg 310 extends from one side of the central and second outer layers 322, 336 to the opposite side of these layers 324, 336. Because the angle setting leg 310 projects to an attachment 345 for maintaining a selected angle adjustment from a side of the second panel 308 facing away from this attachment 345, tension force exerted via the angle setting leg 310 pulls the first outer layer 322 against a panel 308' of the central layer defining the second panel 308. Thus, the first outer layer 322 of which the angle setting leg forms a part is not pulled away from the central layer 324 when the stand 301 is loaded by a device 2 carried thereby.

In the first outer layer 322, adjacent a distal end of the second panel areas 348 are left free for accommodating attachment members 347 for releasably holding the second panel 308 in a position generally co-planar with the first panel 307, so that the second panel 308 is held in-line with the first panel 307 when the stand 301 is in its flat transport position.

The central layer 324 is preferably made of steel, aluminium and/or composite materials, such as a resin/fiber composite. In the central layer 324 magnets or magnetic elements 348 are embedded for co-operation with magnets or magnetic material of the attachment member 347 embedded in the first outer layer 322 if the central layer 324 of the second panel 308 is non-magnetic.

Corresponding openings 349', 349" and 350, 350', 350" in the central layer 324 and the first and second outer layers 322, 336 are provided for ventilation and/or for allowing access to contact sockets in the bottom of a supported device 2.

As in the second example, the first outer layer 322 is equipped with adhesive pads 338 for providing an additional connection of the first outer layer 322 to the bottom of the device 2 to be supported.

At the free end of the angle adjustment leg 310 a magnet or magnetic element 352 is provided for co-operation with a magnet or magnetic element 351 embedded in the central layer 324 near the attachment hooks 345, so that the angle adjustment leg 310 is held flat against the second outer layer 336 (covering the magnet 351) when the stand is in transport position. For the same purpose, another magnet 342 is arranged more proximally in the angle adjustment leg 310.

The invention claimed is:

1. A stand for supporting a portable device with a graphic user interface display, such as a laptop computer or a tablet computer, with a bottom face at an oblique support angle relative to a top surface carrying the stand, the stand comprising:
   a first panel for supporting the device with the bottom face of the device extending along and facing the first panel;
   a second panel hinged so as to be pivotable relative to the first panel about a first hinge axis between a collapsed condition in which the stand is folded flat against the bottom face of the device and an unfolded condition in which the stand can support the device with the bottom face at the oblique support angle relative to the top surface carrying the stand;
   an angle setting leg hinged so as to be pivotable relative to the first panel or the second panel about a second hinge axis spaced from the first hinge axis and having a free end releasably connectable to the other one of the first panel and the second panel at positions at a distance from the first hinge axis for setting an angle between the first panel and the second panel; and
   at least one flexible attachment flap projecting from and extending along at least a portion of at least one outer edge of the first panel, said at least one outer edge surrounding the first panel, the at least one flexible attachment flap having an attachment surface for attachment to or attached to the bottom face of the device facing the first panel.

2. The stand according to claim 1, wherein the at least one flexible attachment flap projects from and extends along at least a portion of at least two edges of the first panel.

3. The stand according to claim 2, wherein the first panel has at least one corner where edges of the first panel meet and wherein the at least one flexible attachment flap extends around said corner of the first panel.

4. The stand according to claim 1, wherein the attachment surface of the at least one flexible attachment flap is formed by at least one of a layer of self-adhesive material, a hook or loop fastening material and an array of magnetically attractable elements.

5. The stand according to claim 1, further comprising spacers mounted to a surface of the first panel arranged to face the device when the stand is attached thereto, for maintaining a spacing between the stand and the bottom face of the device.

6. The stand according to claim 1, comprising at least one layer of flexible sheet material layered with panel members defining the first and second panels, the flexible sheet material constituting the hinge between the first and second panels and constituting at least a layer of the at least one flexible attachment flap.

7. The stand according to claim 1, comprising at least two of said flexible attachment flaps, the attachment surfaces of said flaps being attached to a common backing substrate plate with a stiffness for retaining said flaps in orientations that are substantially parallel to each other.

8. A stand for supporting a portable device with a graphic user interface display, such as a laptop computer or a tablet computer, with a bottom face at an oblique support angle relative to a top surface carrying the stand, the stand comprising:

a first panel for supporting the device;

a second panel hinged so as to be pivotable relative to the first panel about a first hinge axis between a collapsed condition in which the stand is folded flat against the bottom face of the device and an unfolded condition in which the stand can support the device with the bottom face at the oblique support angle relative to the top surface carrying the stand;

an angle setting leg hinged so as to be pivotable relative to the first panel or the second panel about a second hinge axis spaced from the first hinge axis and having a free end releasably connectable to the other one of the first panel and the second panel at positions at a distance from the first hinge axis for setting an angle between the first panel and the second panel;

at least one flexible attachment flap projecting from and extending along at least a portion of at least one edge of the first panel, the at least one flexible attachment flap having an attachment surface for attachment to or attached to the bottom face of the device;

at least one layer of flexible sheet material layered with panel members defining the first and second panels, the flexible sheet material constituting the hinge between the first and second panels and constituting at least a layer of the at least one flexible attachment flap; and at least two layers of flexible sheet material and plates defining the first and second panel, wherein the plates defining the first and second panel are sandwiched between or laminated with said two layers of flexible sheet material.

* * * * *